United States Patent
Ersoy (10) Patent No.: US 8,534,957 B2
(45) Date of Patent: Sep. 17, 2013

(54) COLD ASSISTED PIPE SPLITTING AND BURSTING

(75) Inventor: Daniel Allen Ersoy, Lincolnwood, IL (US)

(73) Assignee: Gas Technology Institute, Des Plaines, IL (US)

( * ) Notice: Subject to any disclaimer, the term of this patent is extended or adjusted under 35 U.S.C. 154(b) by 585 days.

(21) Appl. No.: 12/719,889

(22) Filed: Mar. 9, 2010

(65) Prior Publication Data

US 2011/0222967 A1    Sep. 15, 2011

(51) Int. Cl.
*F16L 55/18* (2006.01)
*F16L 55/44* (2006.01)

(52) U.S. Cl.
USPC ...... 405/184.3; 405/184.1; 166/55; 166/55.2; 166/55.3; 166/170; 166/297; 166/298; 166/302; 166/361; 166/376

(58) Field of Classification Search
USPC ............... 166/297, 298, 376, 55, 55.2, 55.3, 166/361, 170, 302; 405/184.1, 184.3, 259.1, 405/259.5
See application file for complete search history.

(56) References Cited

U.S. PATENT DOCUMENTS

| | | | | |
|---|---|---|---|---|
| 4,220,012 | A | * | 9/1980 | Brister ............................. 62/130 |
| 4,456,401 | A | * | 6/1984 | Williams .................... 405/150.1 |
| 4,963,205 | A | * | 10/1990 | Hubert ............................. 156/80 |
| RE35,271 | E | | 6/1996 | Fisk et al. |
| 6,585,453 | B2 | * | 7/2003 | Robinson .................... 405/184.3 |
| 7,055,621 | B2 | | 6/2006 | Wentworth et al. |
| 7,228,918 | B2 | | 6/2007 | Evans et al. |
| 7,384,214 | B2 | | 6/2008 | Tjader |
| 7,406,738 | B2 | * | 8/2008 | Kinnari et al. .................... 15/3.5 |
| 7,434,315 | B2 | | 10/2008 | Tjader |

FOREIGN PATENT DOCUMENTS

WO    WO 2006044053 A1  *  4/2006

OTHER PUBLICATIONS

Drinkwater Products; Pipeline Pigs; Jun. 14, 2008. Link: http://web.archive.org/web/20080624235806/http://www.drinkwaterproducts.com/products/view/bare-squeegee.*
Wikipedia; Pipeline video inspection; Mar. 13, 2008. Link: http://web.archive.org/web/20080313100431/http://en.wikipedia.org/wiki/Pipeline_video_inspection.*

* cited by examiner

*Primary Examiner* — John Kreck
*Assistant Examiner* — Edwin Toledo-Duran
(74) *Attorney, Agent, or Firm* — Pauley Petersen & Erickson (57) ABSTRACT

A method and system for repairing, replacing or installing an underground pipeline using an appropriate tool head. A coolant, preferably a cryogenic liquid, is injected in front of the tool head to embrittle or otherwise reduce the toughness of the material ahead of the tool head. The method and system of this invention are particularly suitable for use in connection with pipe splitting and pipe bursting, where a pig disposed within the underground pipeline is connected with the appropriate tool head forming a space between the pig and the tool head into which the coolant is introduced. The pipe between the pig and the tool head is embrittled by the coolant, reducing the resistance of a pipe to splitting or bursting which, in turn, reduces the force required for the pig to pull the tool head as the pig is motivated through the pipe.

26 Claims, 7 Drawing Sheets

COLD ASSISTED PIPE SPLITTING AND BURSTING

BACKGROUND OF THE INVENTION

1. Field of the Invention

This invention relates to a trenchless method and system for installing, repairing, and replacing underground pipelines. In one aspect, this invention relates to a method and system for splitting or bursting pipes. In one aspect, this invention relates to a method and system employing ramming, boring, and drilling for the installation of new pipelines.

2. Description of Related Art

Pipe, such as plastic, copper, lead, steel, cast iron, and the like, has been used for connecting homes and creating networks for utilities such as water, sewage, oil, and natural gas. As the pipes become older, they break down, crack, corrode, develop scaling on interior surfaces that can clog the pipe, etc., thereby requiring repair or replacement. However, the repair and eventual replacement of such pipes is expensive and disruptive of normal activity occurring there above, frequently requiring excavation and trenching along the length of the deteriorated pipe.

Successful alternatives to such trenching and excavation are the trenchless techniques known as "pipe bursting" or "pipe splitting" in which the pipe is broken or split apart in situ using a pipe bursting tool or pipe splitting tool pulled or pushed there through. (It should be noted that, although pipe splitting and pipe bursting are different techniques which produce different results, the terms are frequently used interchangeably in the art.) The pipe bursting tool may also include a spreader which pushes the fragmented pipe remains radially outward into the surrounding soil so that the pipe is effectively, though not actually, removed to make way for replacement pipe. Pipe splitters typically use one or more cutting surfaces to split the pipe material. The cutting surfaces engage against the end of the pipe and are pulled in the direction of the pipe to split the pipe.

Replacement plastic pipe or, alternatively, a larger diameter plastic pipe liner in which the replacement pipe will be received, is usually attached to the back end of the pipe bursting or splitting tool so that it is pulled into place as the old pipe is broken apart or split. Large pulling forces are required to pull cutting surfaces with this configuration through the pipe material and thereby split the pipe. In some cases, where the existing pipe is located in soft soil, the substantial pulling force transmitted from the cutting surfaces to the pipe may actually move the pipe through the soil instead of splitting the pipe material. In some cases, where the pipe is positioned proximate other underground objects, such as water or electric utilities, the substantial pulling force, particularly in the case of pipe bursting, may result in damage to such underground objects due to the displacement of pipe fragments and the surrounding soil resulting from the bursting process.

Figure 1:
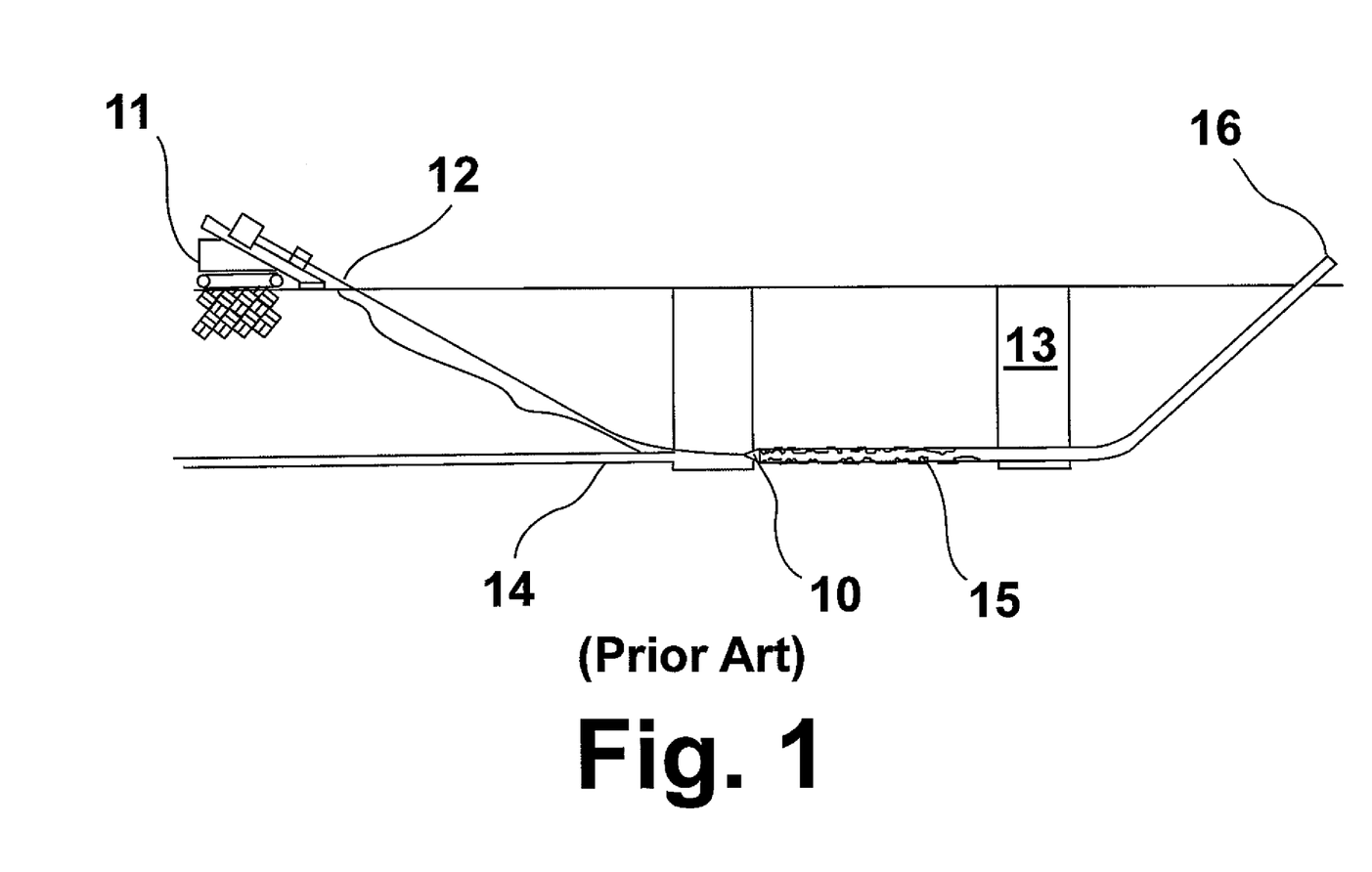
FIG. 1 is a schematic diagram showing a conventional pipe bursting and replacement system.

Referring to FIG. 1, a pipe bursting tool 10 is pulled by a directional drilling machine 11 by means of a drill string 12. The pipe bursting tool is positioned at a starting location, such as a manhole or entrance 13 and pulled through an existing pipeline 14, bursting the pipeline into fragments 15 which remain in the ground. The replacement pipe 16 is drawn along behind the pipe bursting tool, as a result of which the replacement pipe ends up occupying the same space as the existing pipeline.

Figure 2:
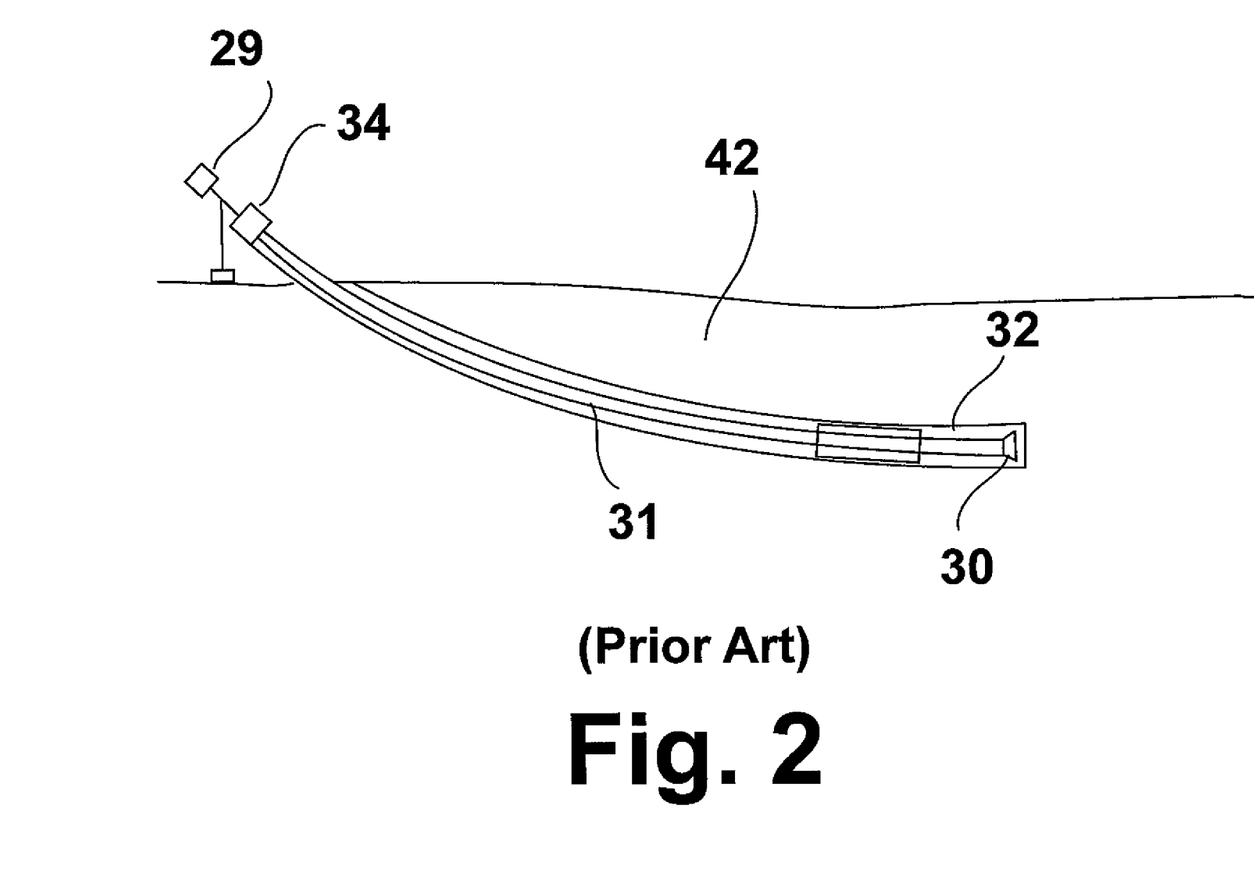
FIG. 2 is a schematic diagram showing a conventional boring or drilling and pipe installation system.

Other trenchless techniques for installing and/or replacing pipe include ramming in which a hydraulically or pneumatically driven impactor is used to drive the selected tool; boring in which a boring tool is used to bore an opening (borehole) in the ground into which a pipe connected with the back side of the boring tool is pulled into the resulting borehole; and drilling in which a drilling tool is used to drill an opening into which a pipe connected with the back side of the drilling tool is pulled into the resulting opening Referring to FIG. 2, a pipe 31 to be installed underground is connected with the back side of a drilling or boring tool 30 and is pulled through the borehole 32 created by the drilling or boring tool. Some form of motivation means, such as a rig comprising a rotary table 34 and a thruster 29, is used to push the drilling or boring tool through the ground 42. The rotary table is driven by hydraulic or electric motors and the thruster advances the pipe as the borehole is made in the ground.

SUMMARY OF THE INVENTION

It is one object of this invention to provide a trenchless method and system for installing, repairing, and/or replacing pipe in the ground which reduces the amount of mechanical force required for the installation and/or replacement process compared with conventional methods and systems.

It is one object of this invention to provide a trenchless method and system for splitting or bursting pipe in which the force required to pull the pipe splitting or pipe bursting tool to split or burst the pipe is significantly reduced compared with conventional methods and systems.

These and other objects are addressed by a trenchless method for installation, repair or replacement of an underground pipe in which a tool head having a front side and a back side and having a pipe connected with the back side of the tool head is motivated underground, pulling the pipe as the tool head moves through the ground. A coolant, preferably a cryogenic liquid, is introduced into the ground ahead of the tool head to embrittle or otherwise reduce the toughness of the material ahead of the tool head, thereby reducing the force required to motivate the tool head forward. The tool head used in the method includes, but is not limited to, a pipe splitting tool, a pipe bursting tool, a boring tool, and a drilling tool.

These and other objects of this invention are addressed in accordance with one embodiment by a trenchless method for splitting or bursting a pipe in which a movable pig connected with a tool head, such as a pipe bursting tool or a pipe splitting tool, is inserted into the interior of a pipe to be broken apart or split. The pig and the tool head are configured so as, together with the pipe, to substantially enclose a space between the pig and the tool head. A coolant of sufficient temperature to embrittle the pipe material is introduced into the space, resulting in embrittlement of the pipe material. In accordance with one preferred embodiment, the coolant is a cryogenic liquid. As the pig and the tool head are motivated through the pipe, the tool head breaks apart or splits the pipe, depending on the type of tool head employed. Because of the embrittlement of the pipe material, which produces a material having reduced toughness, the amount of force required to pull the tool head is substantially reduced compared with current methods and systems.

These and other objects of this invention are also addressed by a system for repairing or replacing underground pipelines comprising a tool head having a front side and a back side, motivation means for moving the tool head in a forward direction in operational communication with the tool head, an installable pipe connected with the back side of the tool head, and embrittlement means for embrittling material ahead of, i.e. in the path of, the tool head.

In accordance with one embodiment, the system for carrying out the method of this invention comprises a pig configured to substantially seal with an interior surface of the pipe wall and a tool head of suitable size and configuration for bursting or splitting the pipe as desired. The tool head is spaced apart from the pig, thereby forming a space between the pig and the tool head when the pig is disposed inside the pipe. Cooling means are provided for introducing a cooling fluid into the space, which cooling fluid reduces the temperature of the pipe from the inside out, resulting in embrittlement of the pipe.

In addition to pipe splitting or bursting, the method and apparatus of this invention may also be employed for other trenchless methods such as vertical and horizontal boring, ramming, and pipe drilling.

BRIEF DESCRIPTION OF THE DRAWINGS

These and other objects and features of this invention will be better understood from the following description taken in conjunction with the drawings, wherein.

DETAILED DESCRIPTION OF THE PRESENTLY PREFERRED EMBODIMENTS

As used herein, the term "pig" refers to a device used to perform a variety of operations relating to the maintenance, repair or replacement of pipelines from within a pipeline. A pig may be unpowered in which case the pig may be pulled or pushed by means of a tether connected with the pig through the pipeline. Alternatively, a pig may be powered, enabling self-motivation through the pipeline. Either a powered or an unpowered pig may be employed in the method and system of this invention.

As used herein, the term "pipe bursting" refers to a process in which a pipe is broken into fragments as a suitable pipe bursting tool head is motivated along the pipe. As used herein, the term "pipe splitting" refers to a process in which a pipe is split apart, without substantial fragmentation, as a suitable pipe splitting tool head is motivated along the pipe. The process employed may depend on several factors, including the pipe material and the environment proximate the pipe. For example, for pipes disposed in an environment requiring limited disturbance of the area surrounding the pipes, pipe splitting may be preferred over pipe bursting.

The method and apparatus of this invention comprise the use of a coolant, preferably a cryogenic liquid such as liquid nitrogen or liquefied natural gas (LNG), to lower the temperature of the material ahead of a tool head used during pipe installation, repair and replacement operations. The tool head may be any suitable device selected from the group consisting of a pipe splitting tool, a pipe bursting tool, a boring tool and a drilling tool, many of which are well known to those skilled in the art. See, for example, U.S. Pat. No. Re. 35,271 to Fisk et al. and U.S. Pat. No. 7,384,214 B2 and U.S. Pat. No. 7,434,315 B2, both to Tjader. The coolant, which may be in liquid or gaseous form, reduces the temperature of the pipe to be split or burst to a low enough temperature sufficient to embrittle, or lower the toughness of, the pipe, making it much easier to split or burst the pipe using conventional equipment. The process, which reduces the amount of force required to split or burst pipe, may be particularly desirable for pipes located in areas where minimal disturbance of the environment surrounding the pipes is required. The method and apparatus of the system may be applied to any pipe, including, but not limited to, metal and plastic pipe.

As previously indicated, the principle of this invention, i.e. the use of a coolant to embrittle material, may be employed for boring, ramming, and drilling applications in addition to pipe bursting and pipe splitting applications. For example, by freezing the area just ahead of a ramming, boring, or drilling fixture, one may be able to create a more brittle material that requires less fixture force, resulting in less wear on the tooling.

Figure 3:
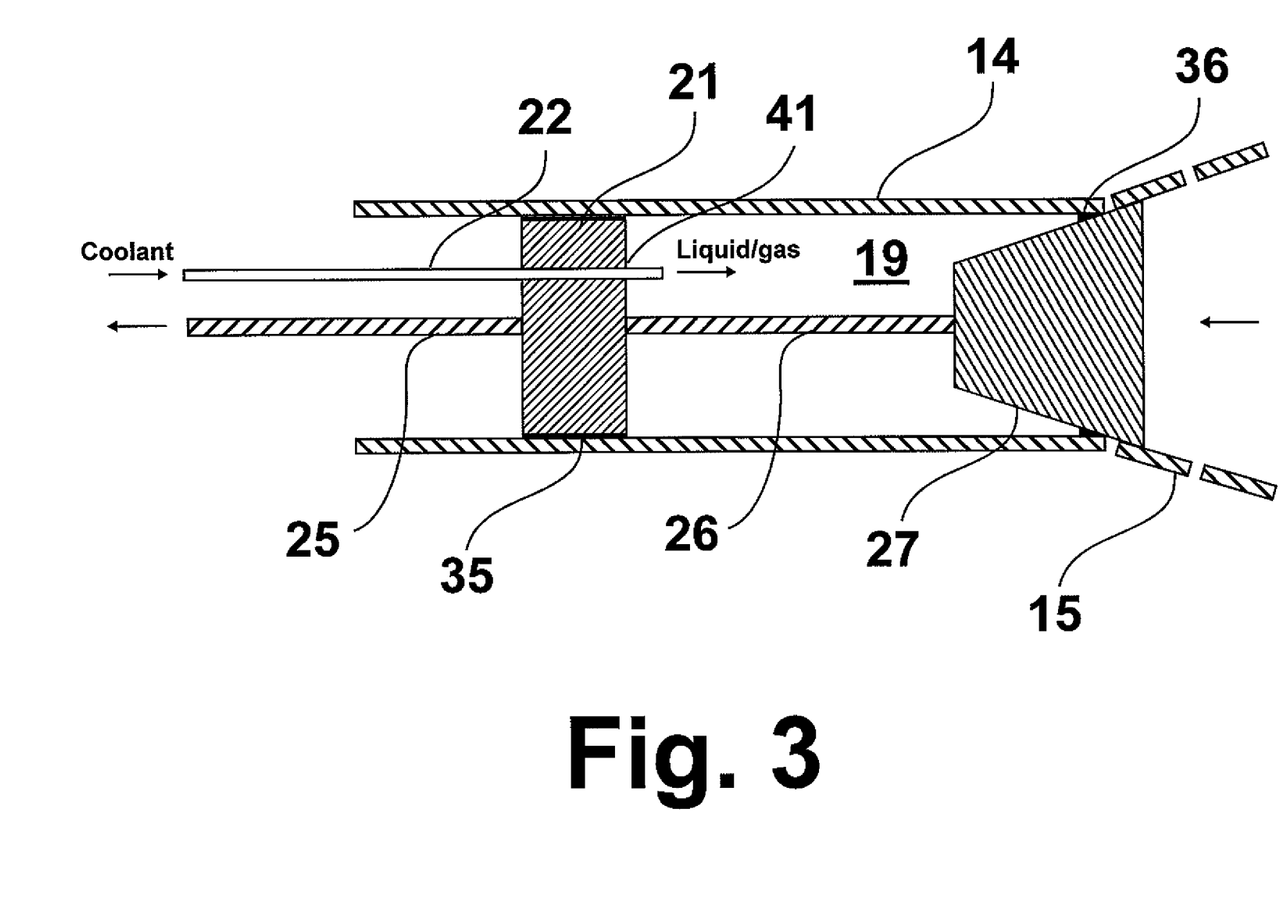
FIG. 3 is a diagram showing a system for pipe bursting, shown in the process of bursting a pipe, in accordance with one embodiment of this invention.

FIG. 3 shows a pipe 14 in the process of pipe bursting employing a system in accordance with one embodiment of this invention. The system comprises an in-line pig 21 connected to one end of a cable 25, the other end of which is connected to a pulling means (not shown), for example, a winch. Pig 21 is connected by cable 26 with a tool head 27 shown bursting the pipe 14. Pig 21 together with the wall of pipe 14 and the tool head 27 substantially enclose a space 19 into which a coolant is introduced. Sealing means 35 are provided for substantially sealing pig 21 against the pipe wall so as to prevent coolant introduced into the space from flowing out of the space into the pipe ahead of pig 21. In accordance with one embodiment of this invention, sealing means 36, although not required may be provided for substantially sealing tool head 27 against the pipe wall as pig 21 is motivated through pipe 14. Such sealing of the tool head against the pipe wall reduces the amount of coolant required as compared with embodiments in which such sealing means are not provided. Pig 21 forms an opening 41 through which a fluid conduit 22 extends into space 19 for providing a coolant to space 19. It will be appreciated by those skilled in the art that other means exist for providing the coolant to space 19, such as a fluid conduit extending through an opening (not shown) formed by the tool head.

In accordance with one embodiment of the method of this invention, the coolant is a cryogenic liquid which enters space 19 as a liquid. In accordance with another embodiment of the method of this invention, the coolant is a cryogenic liquid injected into space 19 in which the liquid flashes to a gas. The coolant quickly cools pipe 14 from the inside out, thereby lowering its material toughness, which facilitates the pipe bursting in a brittle manner, forming fractured pieces or sections 15 as the tool head 27 is pulled against the fracturing pipe end. The additional pressure created by the flashing of the liquid to a gas may assist the bursting operation as well as lubricate the surface between the tool head 27 and the pipe 14.

Figure 4:
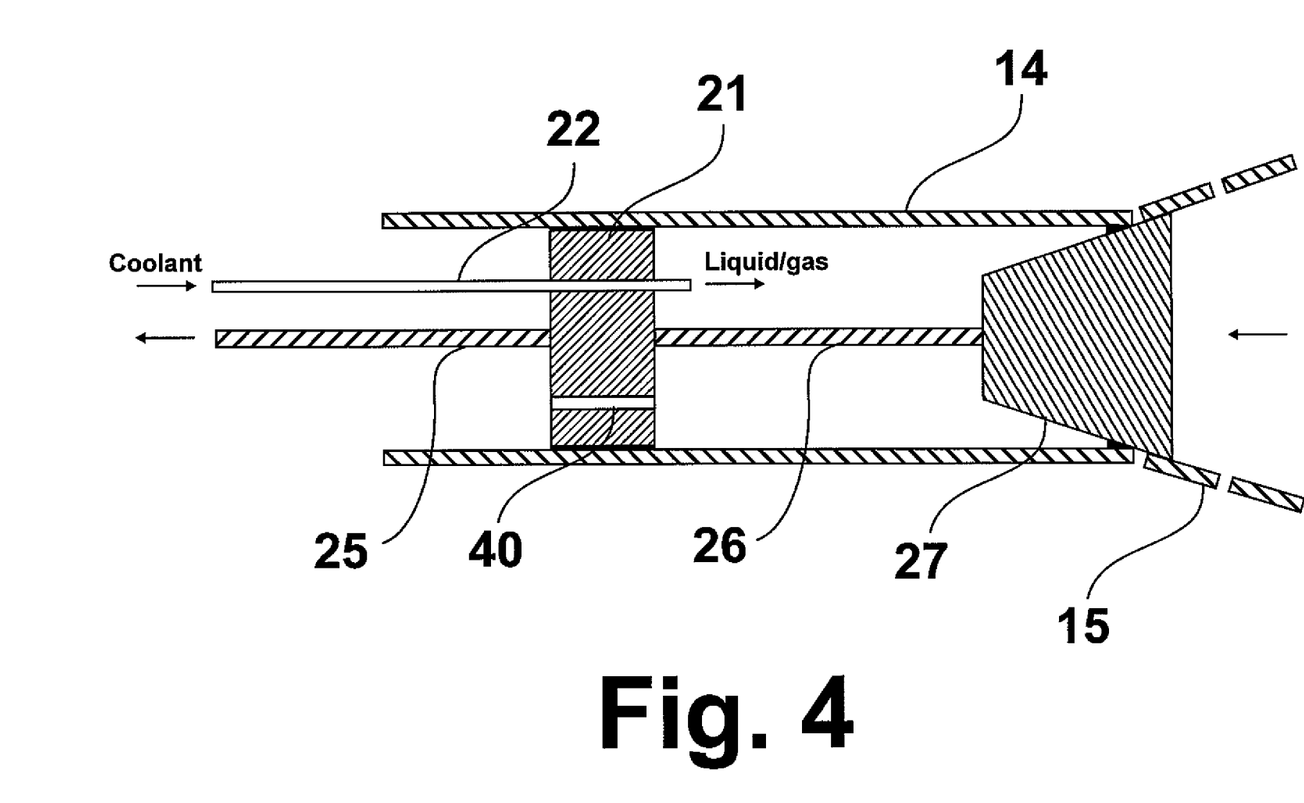
FIG. 4 is a diagram showing a system for pipe bursting, shown in the process of bursting a pipe, in accordance with one embodiment of this invention in which vent means are provided for venting coolant from the space formed between the pig and the tool head.

In the embodiment shown in FIG. 4, pig 21 forms a vent port 40 through which cold gas, formed as the liquid coolant exits conduit 22 into space 19, or formed in space 19 upon heating, is vented back into the pipe ahead of the pig, i.e. the side of the pig opposite the tool head side, thereby pre-cooling the pipe section ahead of the pig. The vent port may also be sized to control the amount of pressure formed in the pipe space 19 adjacent to the tool head.

Figure 5:
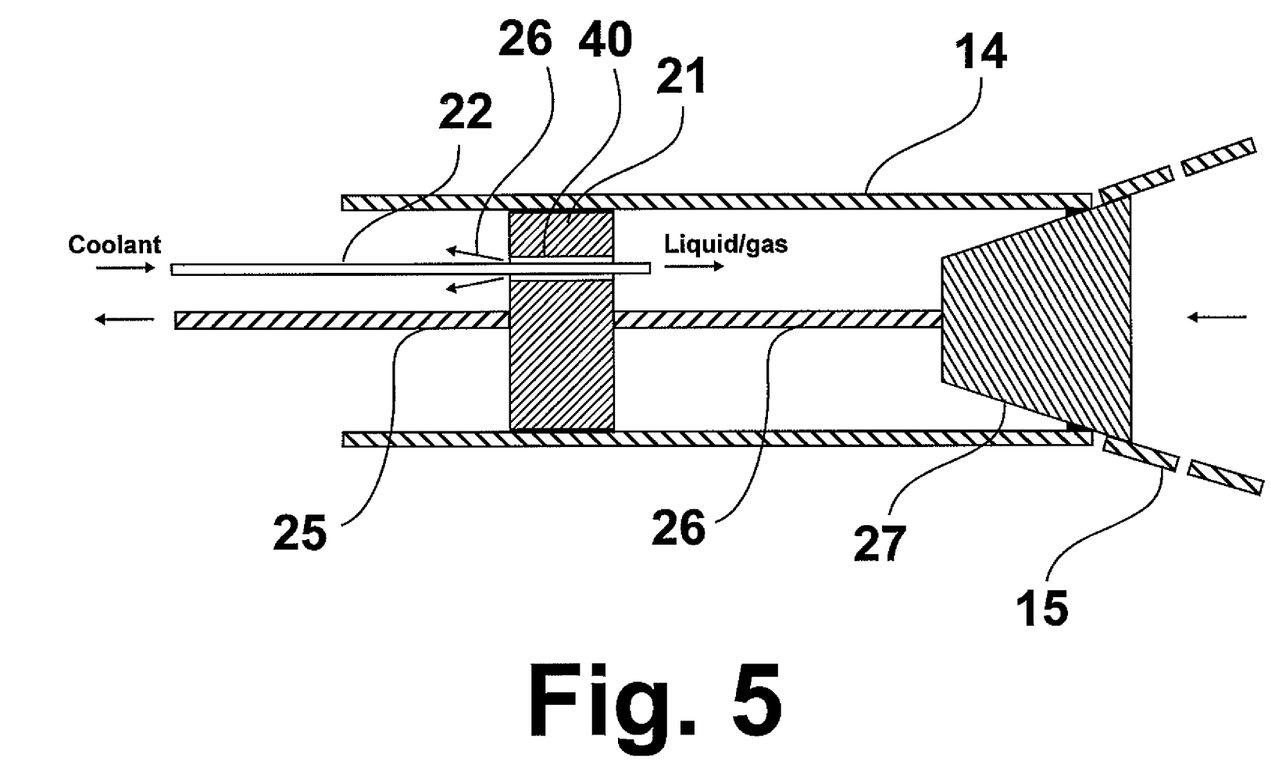
FIG. 5 is a diagram showing a system for pipe bursting, shown in the process of bursting a pipe, in accordance with one embodiment of this invention comprising heat exchange means for exchanging heat between the vented coolant and the injected coolant.

In accordance with one embodiment of the system of this invention as shown in FIG. 5, conduit 22 is concentrically disposed within the vent port 40 formed by pig 21. As in the embodiment shown in FIG. 4, coolant within space 19 is vented back into the pipe ahead of the pig, but in this case, due to the injection of the coolant through conduit 22, a counter-flow heat exchange process is created between the conduit 22 and the venting coolant.

Figure 6:
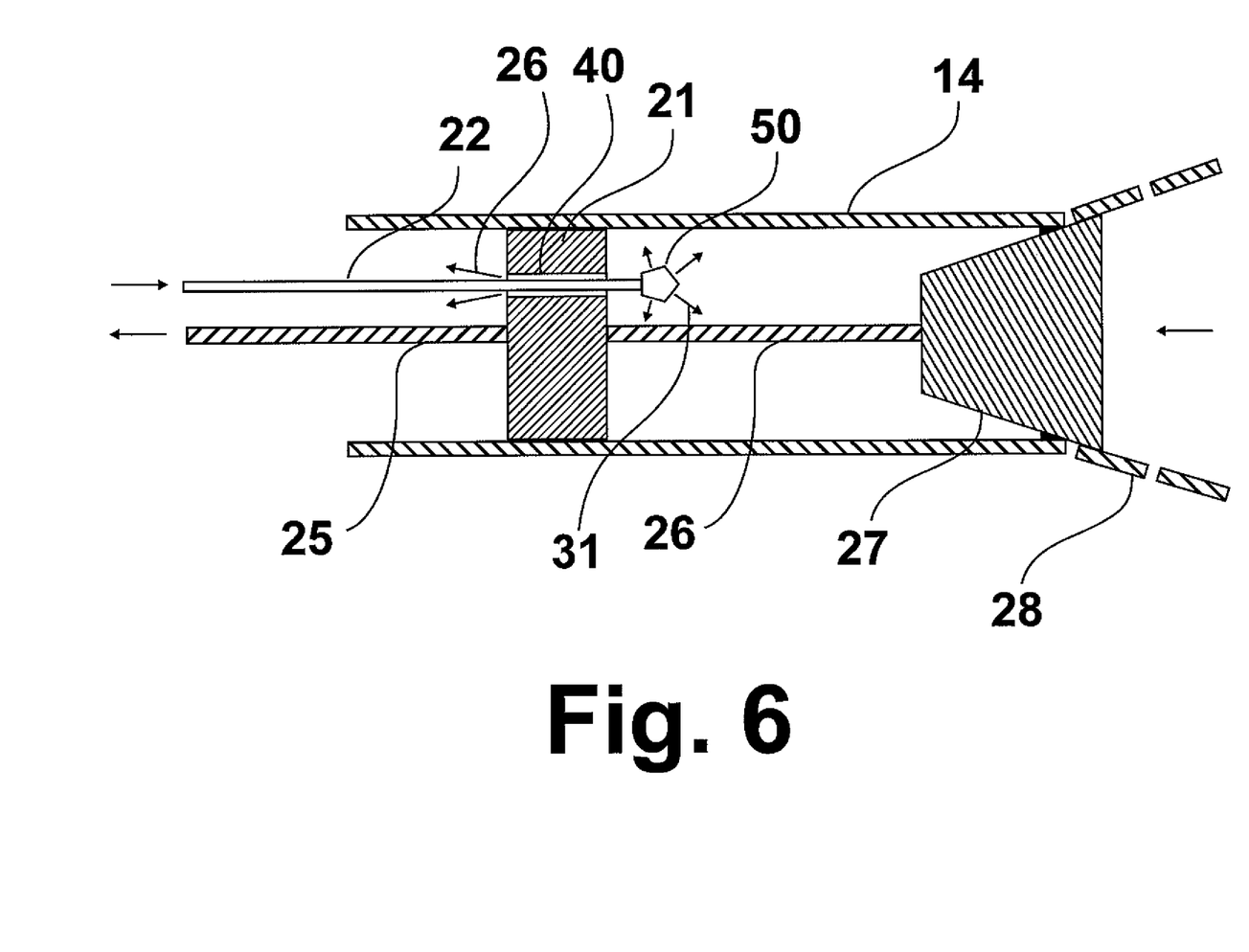
FIG. 6 is a diagram showing a system for pipe bursting, shown in the process of bursting a pipe, in accordance with one embodiment of this invention, in which fluid distribution means are provided for enabling the injection of the coolant into the space in a pattern.
Figure 7:
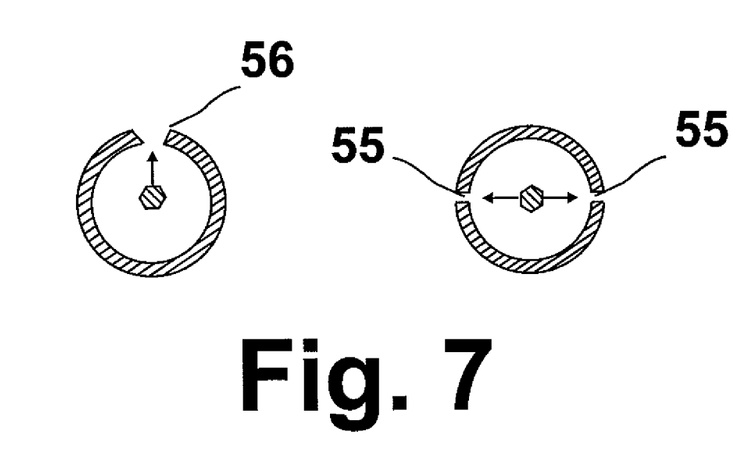
FIG. 7 is a diagram illustrating some of the benefits of using a fluid distribution nozzle in accordance with one embodiment of this invention.

FIG. 6 shows a further embodiment of the system of this invention comprising a fluid distribution nozzle 50 connected with the fluid outlet end of conduit 22 disposed within space 19. The use of fluid distribution nozzle 50 enables direction of the coolant to specific locations on the pipe wall. Thus, for example, during pipe splitting in accordance with one embodiment of the method of this invention, the coolant may be directed horizontally outward from the fluid distribution nozzle, creating embrittled points on the pipe about 180° apart as shown in FIG. 7 such that splitting of the pipe occurs along the embrittled points 55, as opposed to the top 56 of the pipe, so as to prevent portions of the environment surrounding the pipe from falling into the pipe. In addition, the use of such directed super-cooled fluid resulting in focused areas of embrittlement enables the pipe to be preferentially split without a large expansion. Such large expansions can damage or destroy other services, pipelines, and conduits in close proximity to the pipe to be split. The use of directed super-cooled fluid addresses this problem, enabling splitting of the pipe to be performed in areas where it could not previously be performed due to the close proximity of the pipe to the other services, pipelines and conduits. It will be appreciated by those skilled in the art that a variety of fluid distribution patterns may be produced using the fluid distribution nozzle.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for splitting or bursting a replaceable pipe comprising the steps of:
   inserting a movable pig connected with a tool head into a pipe interior of said replaceable pipe, said pig and said tool head configured together with said replaceable pipe to substantially enclose a space between said pig and said tool head;
   introducing a coolant into said space, embrittling said replaceable pipe; and
   moving said pig through said replaceable pipe, said tool head configured to one of split and break apart said replaceable pipe as said pig moves through said replaceable pipe.

2. The method of claim 1, wherein said coolant is a cryogenic fluid.

3. The method of claim 2, wherein said coolant is selected from the group consisting of liquid nitrogen, liquefied natural gas, and mixtures thereof.

4. The method of claim 1, wherein said coolant is introduced into said space through a conduit disposed within an opening formed by said pig and having a coolant inlet end and a coolant outlet end.

5. The method of claim 1, wherein a portion of said coolant in said space is vented through a vent port formed by said pig, pre-cooling said replaceable pipe ahead of said pig.

6. The method of claim 5, wherein said coolant is introduced into said space through a conduit having a coolant inlet end and a coolant outlet end, said conduit disposed in said vent port, creating a counter flow heat exchange process between said conduit and said vent port.

7. The method of claim 4, wherein said coolant is introduced into said space through a fluid distribution nozzle connected with said coolant outlet end of said conduit.

8. The method of claim 1, further comprising pulling said pig through said replaceable pipe, wherein said tool head follows the pig through said replaceable pipe.

9. A method for splitting or bursting a pipe comprising the steps of:
   providing a movable pig connected with a tool head in said pipe, said tool head in contact with an end of said pipe and having a diameter greater than an inside diameter of said pipe;
   embrittling said pipe; and
   moving said pig through said pipe, said tool head one of splitting and breaking apart said pipe as said pig is moved through said pipe.

10. The method of claim 9, wherein said pig and said tool head are configured to form a substantially enclosed space within said pipe between said pig and said tool head, and said pipe is embrittled by introducing a coolant into said space.

11. The method of claim 10, wherein said coolant is a cryogenic fluid.

12. The method of claim 11, wherein said cryogenic fluid is a fluid selected from the group consisting of liquid nitrogen, liquefied natural gas, and combinations thereof.

13. The method of claim 10, wherein a portion of said coolant in said space is vented through a vent port formed by said pig, pre-cooling said pipe ahead of said pig.

14. The method of claim 13, wherein said coolant is introduced into said space through a conduit disposed within said vent port, creating a counter flow heat exchange process between said conduit and said vent port.

15. A system for splitting or bursting a pipe comprising:
   a pig configured to seal with an interior surface of a pipe;
   a tool head connected with said pig and having a diameter greater than an inside diameter of said pipe;
   said pig and said tool head, together with said pipe, enclosing a space between said pig and said tool head when said pig is disposed inside said pipe; and
   a fluid conduit adapted to introduce a cooling fluid into said space.

16. The system of claim 15, wherein said fluid conduit is disposed within an opening formed by said pig and having a coolant inlet end connected with a cooling fluid source and having a coolant outlet end in fluid communication with said space.

17. The system of claim 16, wherein said pig forms a vent port providing fluid communication between said space and said pipe external to said space.

18. The system of claim 17, wherein said opening is said vent port and said fluid conduit is disposed within said vent port.

19. The system of claim 16 further comprising a fluid distribution nozzle connected with said coolant outlet end of said fluid conduit.

20. The system of claim 15, further comprising a cable connecting said pig to a pulling means configured to pull the pig through said replaceable pipe, wherein said tool head follows the pig through said replaceable pipe.

21. A system for repairing or replacing underground pipelines comprising:
   a tool head having a front side and a back side;
   means for moving said tool head in a forward direction in operational communication with said tool head;
   an installable pipe connected with said back side of said tool head; and
   means for embrittling material ahead of said tool head.

22. The system of claim 21, wherein said means for embrittling material ahead of said tool head comprises a conduit having a coolant inlet end and a coolant outlet end providing a cooling fluid to said material ahead of said tool head.

23. The system of claim 22, wherein said tool head is a tool selected from the group consisting of a pipe splitter, a pipe burster, a borer, and a drill bit.

24. The system of claim 22, wherein said means for moving said tool head in a forward direction comprises a pig disposed ahead of said tool head and connected with said tool head, said pig and said tool head together with a pipe wall enclosing a space there between when said pig is disposed in a replaceable pipe.

25. The system of claim 24, wherein said pig forms a coolant opening sized to receive said conduit.

26. The system of claim 25, wherein said pig forms a coolant vent opening in fluid communication with said space and said replaceable pipe ahead of said pig.

\* \* \* \* \*